United States Patent [19]

Matsuhiro et al.

[11] Patent Number: 4,560,669
[45] Date of Patent: Dec. 24, 1985

[54] SILICON NITRIDE SINTERED BODIES OF $Si_3N_4$, $Y_2O_3$, MGO AND $ZRO_2$

[75] Inventors: Keiji Matsuhiro; Minoru Matsui, both of Nagoya, Japan

[73] Assignee: NGK Insulators, Ltd., Japan

[21] Appl. No.: 540,309

[22] Filed: Oct. 11, 1983

[30] Foreign Application Priority Data

Sep. 2, 1983 [JP] Japan ................ 58-160551

[51] Int. Cl.$^4$ .............................. C04B 35/58
[52] U.S. Cl. ........................ 501/97; 264/65; 501/98; 501/104; 501/152; 501/154
[58] Field of Search .................... 501/98, 97

[56] References Cited

U.S. PATENT DOCUMENTS

| | | | |
|---|---|---|---|
| 3,929,498 | 12/1975 | Hancock et al. | 501/103 |
| 4,304,576 | 12/1981 | Hattori et al. | 501/97 |
| 4,312,899 | 1/1982 | Lahmann | 428/446 |
| 4,327,187 | 4/1982 | Komatsu et al. | 501/98 |
| 4,350,771 | 9/1982 | Smith | 501/97 |
| 4,352,308 | 10/1982 | Samanta et al. | 82/1 C |
| 4,354,990 | 10/1982 | Martinengo et al. | 501/154 |
| 4,407,970 | 10/1983 | Komatsu et al. | 501/98 |
| 4,407,971 | 10/1983 | Komatsu et al. | 501/97 |
| 4,412,009 | 10/1983 | Komatsu et al. | 501/98 |
| 4,492,765 | 1/1985 | Buljan | 501/97 |

FOREIGN PATENT DOCUMENTS 2011952  7/1979  United Kingdom .................. 501/97

OTHER PUBLICATIONS

Giachello, A. et al.—Ceramic Bulletin, 59(12), (1980), pp. 1212–1215, "Sintering and Properties of Silicon Nitride Containing $Y_2O_3$ and MgO".
Babini, G. N. et al.—J. Materials Science, 18, (1983), pp. 231–244, "Oxidation of Silicon Nitride Hot Pressed with $Y_2O_3$ and MgO".

*Primary Examiner*—Helen M. McCarthy
*Attorney, Agent, or Firm*—Parkhurst & Oliff

[57] ABSTRACT

Highly densified silicon nitride sintered bodies having excellent mechanical strength and oxidation resistance consist essentially of $Si_3N_4$ and contain Y, Mg and Zr, in which a content of $Si_3N_4$ is 95–70% by weight, a content of yttrium is 15–2% by weight calculated as $Y_2O_3$, a content of magnesium is 15–0.5% by weight calculated as MgO and a content of zirconium is 13–0.5% by weight calculated as $ZrO_2$ and are produced by forming a mixed raw powder consisting of 95–70% by weight of silicon nitride raw powder, yttrium compound of 15–2% by weight calculated as $Y_2O_3$, magnesium compound of 15–0.5% by weight calculated as MgO and zirconium compound of 13–0.5% by weight calculated as $ZrO_2$ into a shaped body, said yttrium compound, magnesium compound and zirconium compound being sintering aids, and firing the shaped body at a temperature of 1,650°–1,800° C. under ambient pressure in a nitrogen or an inert gas atmosphere.

13 Claims, 2 Drawing Figures

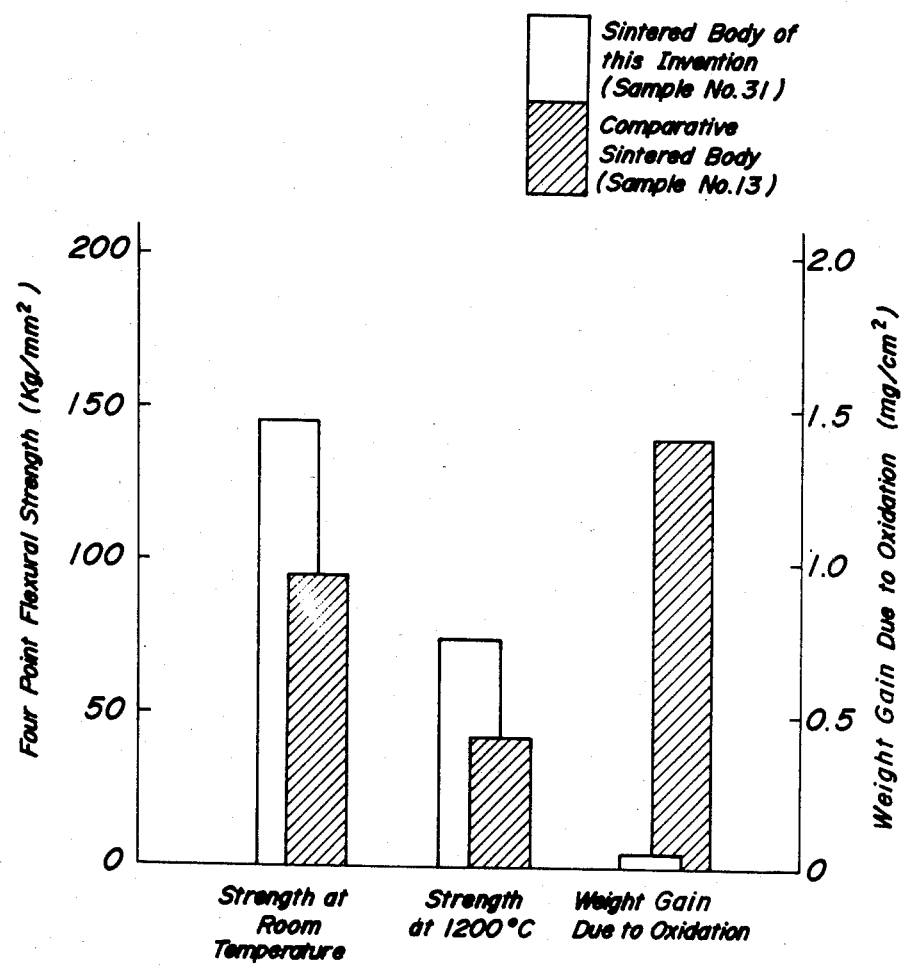

SILICON NITRIDE SINTERED BODIES OF $Si_3N_4$, $Y_2O_3$, MGO AND $ZrO_2$

BACKGROUND OF THE INVENTION

1. Field of the Invention

The present invention relates to highly densified silicon nitride sintered bodies having excellent mechanical strength and oxidation resistance and a method for producing the same.

2. Description of the Prior Art

Silicon nitride sintered bodies have excellent mechanical strength, heat resistance, thermal shock resistance and corrosion resistance as compared with metal materials and therefore it is intended to apply these bodies to various machine parts which are operated at high temperature at which metal materials cannot be used. The development of applications of these materials has progressed extensively.

Requisite properties for materials to be used as machine parts which operate at high temperature include, high oxidation resistance, which is required in view of the durability and dimensional stability in use of the parts for a long period of time, and mechanical properties, such as high strength at high temperature.

In general, when comparing the mechanical properties of silicon nitride sintered bodies with silicon carbide sintered bodies, silicon nitride sintered bodies have been superior to silicon carbide sintered bodies in view of their mechanical properties, for example, flexural strength, fracture toughness, thermal shock resistance and the like. On the other hand, silicon carbide sintered bodies are superior in view of the oxidation resistance to silicon nitride sintered bodies. Therefore, in any prior silicon nitride sintered bodies, the improvement of the oxidation resistance is strongly demanded together with the improvement of the mechanical properties.

Manufacturing processes for obtaining highly densified silicon nitride sintered bodies have included, pressureless sintering and hot press sintering, and the like, but the pressureless sintering can produce easily and cheaply various products in mass production but requires a large amount of sintering aid to achieve appropriate densification for high temperature strength and oxidation resistance. The hot press sintering and the like can obtain the sintered bodies having a high density by using a small amount of sintering. However, in order to obtain large articles or complicated shapes in mass production this process has a great drawback because the production cost is very high.

SUMMARY OF THE INVENTION

An object of the present invention is to produce silicon nitride sintered bodies having a high density and high strength and excellent oxidation resistance, while ameliorating the known drawbacks, and a method for easily and cheaply producing such silicon nitride sintered bodies through pressureless sintering.

The present invention lies in silicon nitride sintered bodies consisting essentially of $Si_3N_4$ and containing Y, Mg and Zr, which consist of 95-70% by weight of $Si_3N_4$, yttrium content of 15-2% by weight calculated as $Y_2O_3$, magnesium content of 15-0.5% by weight calculated as MgO, and zirconium content of 13-0.5% by weight calculated as $ZrO_2$ and a method for producing silicon nitride sintered bodies which comprises forming mixed powders consisting essentially of 95-70% by weight of $Si_3N_4$, yttrium compound of 15-2% by weight calculated as $Y_2O_3$, magnesium compound of 15-0.5% by weight calculated as MgO, and zirconium compound of 13-0.5% by weight calculated as $ZrO_2$ into a shaped body and firing the shaped body at a temperature of 1,650°-1,800° C. under ambient pressure in a nitrogen or an inert gas atmosphere.

BRIEF DESCRIPTION OF THE DRAWINGS

FIG. 2 is a graph showing comparison of the strength at room temperature, strength at 1,200° C. and weight gain due to oxidation of a silicon nitride sintered body (Sample No. 31) of the present invention with a comparative sintered body (Sample No. 13).

DESCRIPTION OF THE PREFERRED EMBODIMENTS

Figure 1:
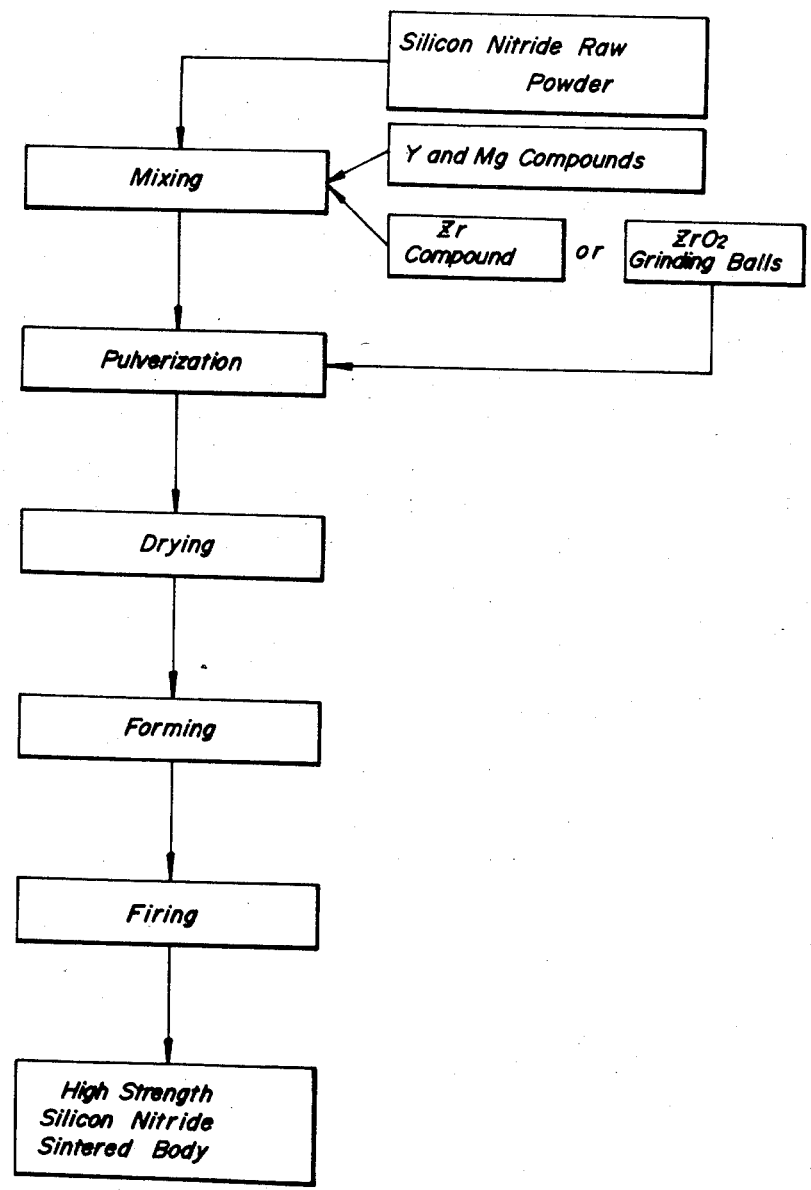
FIG. 1 is a flow diagram of a method for producing silicon nitride sintered bodies of the present invention.

In silicon nitride sintered bodies of the present invention, a second phase consisting of the specifically defined amounts of Y, Mg, Zr, Si, O and N is formed between the grain boundary of $Si_3N_4$ crystals during the firing thereof and superior effects for promoting densification, for controlling the micro-structure and the oxidation resistance are achieved. These superior effects are achieved through the second phase having a specifically defined composition. Such silicon nitride sintered bodies have been produced by forming the mixture containing the specifically defined amount of the specifically defined type and amounts of sintering aids in $Si_3N_4$ raw powder into a shaped body and firing the shaped body in a nitrogen or an inert gas atmosphere under ambient pressure.

A more detailed explanation of the silicon nitride sintered bodies of the present invention follows. The composition of the sintered body contains Y, Mg and Zr and a content of Y is 15-2% by weight calculated as $Y_2O_3$, a content of Mg is 15-0.5% by weight calculated as MgO, a content of Zr is 13-0.5% by weight, preferably 3.9-0.5% by weight calculated as $ZrO_2$ and $Si_3N_4$ is 95-70% by weight. The content ratio of Y and Mg is preferred to be 9-1, more preferably 4-1.2 calculated as the weight ratio of $Y_2O_3$/MgO. The relative theoretical density is greater than 95%, the four-point flexural strength is greater than 60 $kg/mm^2$ and the weight gain due to oxidation when exposing in air at 1,200° C. for 100 hours is less than 0.5 $mg/cm^2$.

The reason why silicon nitride sintered bodies of the present invention exhibit high density, high strength and excellent oxidation resistance is presumably based on the following facts.

It is known that the compounds of Y, Mg and Zr show an activity for promoting the densification of $Si_3N_4$ by using the component alone, in combination with two components thereof or in combination with a third component other than these components, to function as a sintering aid for $Si_3N_4$. However, in the sintered bodies of the present invention containing the specifically defined amounts of Y, Mg and Zr, the following four results occur during sintering:

(1) the progress of densification due to the particle rearrangement mechanism based on Mg—Si—O—N base liquid formation in the initial low temperature state in the firing process, (2) the improvement of the bonding strength of mutual $Si_3N_4$ crystals due to the diffusion controlled phase transformation mechanism of α-type $Si_3N_4$ crystal to β-type $Si_3N_4$ crystal based on Y—Si—O—N base liquid formation in the moderate and high temperature state from the middle to the final stage of sintering process, (3) the improvement of the fracture toughness owing to $ZrO_2$ crystal dispersed in the grain boundary of $Si_3N_4$ crystal, and (4) the improvement of oxidation resistance due to Y—Mg—Zr—Si—O—N base grain boundary phase formation.

These results provide the sintered bodies with enhanced properties compared to those developed by a single compound of yttrium, magnesium and zirconium or a combination of two compounds thereof, due to the synergistic effect.

Silicon nitride sintered bodies of the present invention can be produced by the following method which is summarized in FIG. 1.

A mixture containing 95–70% by weight of silicon nitride raw powder, 15–2% by weight of yttrium compound calculated as $Y_2O_3$, 15–0.5% by weight of magnesium compound calculated as MgO and 13–0.5% by weight, preferably 3.9–0.5% by weight of zirconium compound calculated as $ZrO_2$, preferably the weight ratio of Y to Mg being 9-1, more preferably 4-1.2 calculated as $Y_2O_3/MgO$, yttrium compound, magnesium compound and zirconium compound being the sintering aid, is prepared. In this case, the pulverization and mixing of the raw powders are effected, for example, by a rotation mill, a vibration mill, an attrition mill and the like and either wet pulverizing or dry pulverizing may be utilized and the pulverizing conditions, such as powder treatment, grinding ball amount, liquid medium amount and the like are properly selected depending upon the pulverizing process. The liquid medium selected is acetone, alcohol, water or the like. The pulverizing time varies depending upon the pulverizing process and the treating amount, but it is selected so that the average grain size and BET specific surface area of pulverized powder achieve certain saturated values. The raw materials for the yttrium compound and magnesium compound may be added in the form of a powder or a solution, but the zirconium compound may be added in forms other than powder or solution, by, for example, through abrasion of grinding balls made of zirconia ceramics during the pulverizing step. When $ZrO_2$ is added through abrasion of grinding balls, an amount of $ZrO_2$ incorporated during the pulverizing step is previously confirmed and the pulverizing condition should be carefully checked so that said amount is within a range of 13–0.5% by weight.

The grinding balls made of zirconia ceramics should have a content of $ZrO_2$ of greater than 70% by weight and the remainder being mainly $Y_2O_3$ and/or MgO and the relative density being greater than 90%.

The thoroughly pulverized and mixed raw material may be added with an organic binder, such as polyvinyl alcohol and the like, if necessary, and the resulting mixture is stirred and then the powder or slurry is dried to obtain a shaping powder. The shaping powder if formed into desired shapes through hydrostatic press molding and the like and then fired under ambient pressure in a nitrogen atmosphere or in an inert gas atmosphere at a temperature of 1,650°–1,800° C., preferably 1,670°–1,750° C., for 0.5–2 hours to obtain a silicon nitride sintered body. The raw material powder of silicon nitride is preferred to be one in which the content of α-phase is more than 50% by weight and the total amount of Fe, Al, Ca, Na and K as the impurities is less than 1% by weight, the BET specific surface area is 20–2 $m^2/g$ and the average grain size is less than 1 μm. As the compounds of yttrium, magnesium or zirconium, use may be made of any one which may be formed into oxides or oxy-nitrides through firing, for example, $Y_2O_3$, $Y(NO_3)_3$, MgO, $Mg(OH)_2$, $MgCO_3$, $Mg(NO_3)_2 \cdot 6H_2O$, $ZrO_2$, $ZrO(OH)_2$, etc. which have a purity of more than 99% by weight.

When these compounds are added as a powder, those powders having an average grain size of less than 5 μm and a BET specific surface area of 1–50 $m^2/g$ are preferable. These compounds may be used in such a manner that they are impregnated in a silicon nitride raw material powder in the form of an aqueous solution of nitrate or an alkoxide solution and then converted into oxides.

The reason for limiting the components of the present invention will be explained hereinafter.

The content of $Si_3N_4$ in silicon nitride sintered bodies of the present invention is defined to be 95–70% by weight, because when the content exceeds 95% by weight, an amount of the sintering aid is deficient and the sinterability is not satisfied, while when the content is less that 70% by weight, excellent mechanical strength and heat resistance possessed by $Si_3N_4$ are diminished.

The compounds of yttrium, magnesium and zirconium are defined to be 15–2% by weight calculated as $Y_2O_3$, 15–0.5% by weight calculated as MgO and 13–0.5% by weight calculated as $ZrO_2$ respectively, because if any one of these components is excessive or insufficient, the synergistic activity developed by these components as the sintering aid in the sintering process is reduced and the density, mechanical strength and oxidation resistance of the sintered bodies is reduced. With respect to zirconium, the particularly desirable results can be obtained in the content of 3.9–0.5% by weight calculated as $ZrO_2$.

Then, the reason why silicon nitride raw powder is defined to be 95–70% by weight and each compound of yttrium, magnesium and zirconium as the sintering aid is respectively defined to be 15–2% by weight calculated as $Y_2O_3$, 15–0.5% by weight calculated as MgO and 13–0.5% by weight calculated as $ZrO_2$ in the method for producing silicon nitride sintered bodies, is as follows. The contents of $Si_3N_4$, Y, Mg and Zr in the sintered bodies are respectively made to be 95–70% by weight, 15–2% by weight calculated as $Y_2O_3$, 15–0.5% by weight calculated as MgO and 13–0.5% by weight calculated as $ZrO_2$.

Any one of silicon nitride sintered bodies within the limitation of components in the present invention have a high oxidation resistance but when the contents of yttrium and magnesium are within the range of 9-1, calculated as the weight ratio of $Y_2O_3/MgO$, the oxidation resistance is particularly high, because the oxidation resistance of the grain boundary phase composed of Y—Mg—Zr—Si—O—N is particularly improved within the particularly defined range of the weight ratio of $Y_2O_3/MgO$. The definition of the relative theoretical density being greater than 95%, the four point flexural strength at 1,200° C. being greater than 60 $kg/mm^2$ and the weight increase due to oxidation when exposing in air at 1,200° C. being less than 0.5 $mg/cm^2$ indicates that the properties of the sintered bodies of the present invention are stable at high temperatures.

The reason why it is preferable to add zirconium compound in the raw material as $ZrO_2$ through abrasion of the grinding balls made of zirconia ceramics in the course of pulverizing is as follows. Such addition results in a uniform dispersion in a shorter time period and also a higher pulverizing effect can be concurrently developed owing to zirconia ceramics having a high density, resulting in a decrease in production time and homogenization of the sintered bodies can be easily attained.

The following examples are given for the purpose of illustration of this invention and are not intended as limitations thereof.

EXAMPLE 1

Silicon nitride raw powder having a purity of 97.1% by weight, an average particle size of 0.7 μm and a BET specific surface area of 20 m²/g was mixed with $Y_2O_3$, MgO and $ZrO_2$ raw material powders used as a sintering aid, each having a purity of 99-98% by weight, an average particle size of 1.4-0.6 μm and a BET specific surface area of 30-10 m²/g in a compounding recipe, as shown in the following Table 1, to prepare a mixed powder. An amount totaling 200 g of the mixed powder was charged into a vessel made of nylon resin and having a capacity of 1.2 l, together with 500 g of grinding balls made of iron having a diameter of 7 mm and coated with nylon resin on the surface, and 500 ml of acetone, and then pulverized for 10 hours by means of a vibratory mill vibrated at a rate of 1,200 frequencies per minute. Then, the acetone was evaporated and the resulting pulverized raw material mixture was granulated into particles having an average grain size of 100 μm. The granulated particles were formed into a shaped body having a dimension of 60×60×6 mm by a hydrostatic press under a pressure of 3 tons/cm². The shaped body was sintered at a firing temperature shown in Table 1 for 0.5 hour under ambient pressure in a nitrogen atmosphere to produce silicon nitride sintered bodies according to the present invention (Sample Nos. 1-12). Separately, comparative silicon nitride sintered bodies (Sample Nos. 13-24) having a composition outside the scope of the present invention were produced under the same condition as described above. These sintered bodies were measured with respect to the contents of $Si_3N_4$, $Y_2O_3$, MgO and $ZrO_2$; weight ratio of $Y_2O_3$/MgO; relative density; strengths at room temperature and 1,200° C.; and weight gain due to oxidation in the exposure to air at 1,200° C. for 100 hours. The obtained results are shown in Table 1.

The strength is a four point flexural strength measured according to JIS R-1601, "Testing Method for Flexural Strength (Modulus of Rupture) of High Performance Ceramics", and the weight gain due to oxidation is a value obtained by dividing the weight of a sample increased when the sample is soaked at the high temperature, by the surface area of the sample.

It can be seen from Table 1 that the sintered bodies having a composition containing $Si_3N_4$, $Y_2O_3$, MgO and $ZrO_2$ in an amount within the range defined in the present invention have a relative density of at least 95%, a strength at room temperature of at least 110 kg/mm², a strength at 1,200° C. of at least 60 kg/mm², and a weight increase due to oxidation of not more than 0.5 mg/cm² in the exposure to air at 1,200° C. for 100 hours. Therefore, it is apparent that the sintered body of the present invention has properties remarkably superior to those of comparative sintered body.

TABLE 1

| | Sample No. | Compounding recipe (wt. %) | | | | | Firing temperature (°C.) | Composition of sintered body (wt. %) | | | | |
|---|---|---|---|---|---|---|---|---|---|---|---|---|
| | | $Si_3N_4$ | $Y_2O_3$ (converted value) | MgO (converted value) | $ZrO_2$ (converted value) | Weight ratio of $Y_2O_3$/MgO | | $Si_3N_4$ | $Y_2O_3$ (converted value) | MgO (converted value) | $ZrO_2$ (converted value) | Weight ratio of $Y_2O_3$/MgO |
| Sintered body of this invention | 1 | 95.0 | 4.0 | 0.5 | 0.5 | 8.0 | 1,800 | 94.8 | 4.1 | 0.5 | 0.5 | 8.2 |
| | 2 | 90.0 | 2.0 | 1.0 | 7.0 | 2.0 | 1,750 | 89.7 | 2.0 | 1.0 | 6.8 | 2.0 |
| | 3 | 85.0 | 2.0 | 5.0 | 8.0 | 0.4 | 1,700 | 84.6 | 2.1 | 4.8 | 7.9 | 0.44 |
| | 4 | 74.0 | 12.0 | 1.0 | 13.0 | 12.0 | 1,700 | 74.1 | 12.2 | 0.9 | 12.7 | 13.56 |
| | 5 | 70.0 | 15.0 | 2.0 | 13.0 | 7.5 | 1,650 | 70.1 | 14.9 | 2.1 | 12.9 | 7.10 |
| | 6 | 90.0 | 4.0 | 2.0 | 4.0 | 2.0 | 1,750 | 90.2 | 3.7 | 1.8 | 4.1 | 2.06 |
| | 7 | 87.0 | 6.0 | 4.0 | 3.0 | 1.5 | 1,700 | 86.8 | 5.9 | 4.0 | 3.1 | 1.48 |
| | 8 | 85.0 | 9.0 | 1.0 | 5.0 | 9.0 | 1,700 | 85.3 | 9.2 | 0.9 | 4.9 | 10.22 |
| | 9 | 85.0 | 6.0 | 4.0 | 5.0 | 1.5 | 1,700 | 84.8 | 6.1 | 3.9 | 5.0 | 1.56 |
| | 10 | 84.0 | 7.0 | 7.0 | 2.0 | 1.0 | 1,700 | 84.0 | 6.9 | 7.1 | 2.1 | 0.97 |
| | 11 | 89.0 | 5.0 | 4.0 | 2.0 | 1.25 | 1,750 | 89.2 | 5.0 | 3.9 | 2.1 | 1.28 |
| | 12 | 70.0 | 2.0 | 15.0 | 13.0 | 0.13 | 1,700 | 70.0 | 2.0 | 14.8 | 13.0 | 0.14 |
| Comparative sintered body | 13 | 77.0 | 16.0 | 4.0 | 3.0 | 4.0 | 1,700 | 77.3 | 16.2 | 3.7 | 3.1 | 4.38 |
| | 14 | 75.0 | 6.0 | 16.0 | 3.0 | 0.38 | 1,650 | 75.2 | 6.1 | 15.9 | 3.0 | 0.38 |
| | 15 | 76.0 | 6.0 | 4.0 | 14.0 | 1.5 | 1,700 | 76.0 | 6.0 | 3.9 | 13.8 | 1.54 |
| | 16 | 92.0 | 1.0 | 4.0 | 3.0 | 0.25 | 1,850 | 92.0 | 1.0 | 4.1 | 2.9 | 0.24 |
| | 17 | 90.7 | 6.0 | 0.3 | 3.0 | 20.0 | 1,800 | 90.5 | 6.1 | 0.3 | 3.0 | 20.33 |
| | 18 | 89.7 | 6.0 | 4.0 | 0.3 | 1.5 | 1,750 | 89.4 | 5.8 | 4.1 | 0.3 | 1.41 |
| | 19 | 68.0 | 15.0 | 5.0 | 12.0 | 3.0 | 1,600 | 67.7 | 15.1 | 4.9 | 12.2 | 3.08 |
| | 20 | 97.0 | 1.0 | 0.5 | 0.5 | 2.0 | 1,850 | 96.9 | 1.0 | 0.4 | 0.5 | 2.50 |
| | 21 | 90.0 | 6.0 | 4.0 | — | 1.5 | 1,700 | 90.2 | 6.1 | 4.0 | — | 1.53 |
| | 22 | 90.0 | — | 5.0 | 5.0 | — | 1,750 | 89.7 | — | 4.8 | 5.1 | — |
| | 23 | 91.0 | 6.0 | — | 3.0 | — | 1,700 | 90.9 | 5.7 | — | 3.2 | — |
| | 24 | 92.0 | 8.0 | — | — | — | 1,750 | 91.6 | 7.8 | — | — | — |

| | Sample No. | Relative density (%) | Strength (kg/mm²) room temperature | Strength (kg/mm²) 1,200° C. | Weight gain due to oxidation (mg/cm²), 1,200° C. × 100 hr |
|---|---|---|---|---|---|
| Sintered body of this | 1 | 95.6 | 112 | 60 | 0.41 |
| | 2 | 95.5 | 113 | 61 | 0.44 |
| | 3 | 96.3 | 115 | 62 | 0.49 |

TABLE 1-continued

| | | | | | |
|---|---|---|---|---|---|
| invention | | 4 | 96.6 | 111 | 60 | 0.47 |
| | | 5 | 95.0 | 114 | 64 | 0.42 |
| | | 6 | 97.2 | 126 | 65 | 0.44 |
| | | 7 | 96.6 | 141 | 73 | 0.08 |
| | | 8 | 96.5 | 125 | 69 | 0.21 |
| | | 9 | 97.6 | 131 | 66 | 0.22 |
| | | 10 | 97.8 | 126 | 70 | 0.21 |
| | | 11 | 98.1 | 144 | 74 | 0.09 |
| | | 12 | 95.1 | 113 | 64 | 0.43 |
| Comparative sintered body | | 13 | 94.3 | 95 | 43 | 1.4 |
| | | 14 | 94.1 | 90 | 44 | 1.2 |
| | | 15 | 93.4 | 98 | 34 | 1.7 |
| | | 16 | 92.6 | 85 | 43 | 1.3 |
| | | 17 | 93.6 | 99 | 32 | 1.1 |
| | | 18 | 94.0 | 89 | 30 | 1.0 |
| | | 19 | 93.1 | 85 | 34 | 1.9 |
| | | 20 | 93.2 | 71 | 34 | 1.6 |
| | | 21 | 93.1 | 77 | 35 | 1.8 |
| | | 22 | 92.4 | 81 | 39 | 1.5 |
| | | 23 | 93.7 | 77 | 37 | 1.1 |
| | | 24 | 94.8 | 76 | 45 | 1.2 |

EXAMPLE 2

The same silicon nitride raw powder and raw material powders of sintering aids as used in Example 1 were mixed, and sintered bodies having various weight ratios of $Y_2O_3/MgO$ were produced. The comparison of the properties of the resulting sintered bodies is shown in the following Table 2. It is apparent from Table 2 that sintered bodies (Sample Nos. 25, 26 and 27) having a weight ratio of $Y_2O_3/MgO$ of 9.0–1.0 are superior in the relative density strength and weight increase due to oxidation to those (Sample Nos. 28 and 29) having a weight ratio of $Y_2O_3/MgO$ of higher than 9.0 or lower than 1.0.

is 97% by weight and the MgO content is 3% by weight, and the specific gravity is 5.7. The pulverization condition, forming and firing conditions were the same as those in Example 1. In the production of sintered body containing $ZrO_2$ formed by the abrasion of zirconia ceramic grinding balls, the pulverization time was varied as described in Table 3 so as to obtain sintered bodies containing a given amount of $ZrO_2$.

As seen from Table 3, sintered bodies (Sample Nos. 30–33) containing $ZrO_2$ formed by the abrasion of zirconia ceramic grinding balls have substantially the same excellent properties, as those of a sintered body (Sample No. 34) obtained by adding $ZrO_2$ as a raw material to the mixture of the silicon nitride and the other sintering

TABLE 2

| | | Compounding recipe (wt. %) | | | | | Composition of sintered body (wt. %) | | | | |
|---|---|---|---|---|---|---|---|---|---|---|---|
| | Sample No. | $Si_3N_4$ | $Y_2O_3$ (converted value) | MgO (converted value) | $ZrO_2$ (converted value) | Weight ratio of $Y_2O_3/MgO$ | Firing temperature (°C.) | $Si_3N_4$ | $Y_2O_3$ (converted value) | MgO (converted value) | $ZrO_2$ (converted value) | Weight ratio of $Y_2O_3/MgO$ |
| Sintered body of this invention | 25 | 74.0 | 10.5 | 10.5 | 5.0 | 1.0 | 1,700 | 73.8 | 10.4 | 10.3 | 4.9 | 1.01 |
| | 26 | 74.0 | 17.5 | 3.5 | 5.0 | 5.0 | 1,700 | 73.9 | 17.6 | 3.4 | 5.0 | 5.18 |
| | 27 | 74.0 | 18.9 | 2.1 | 5.0 | 9.0 | 1,700 | 73.9 | 18.9 | 2.1 | 4.8 | 9.00 |
| | 28 | 74.0 | 7.0 | 0.5 | 5.0 | 0.5 | 1,700 | 73.8 | 7.0 | 0.5 | 5.0 | 14.0 |
| | 29 | 74.0 | 19.1 | 1.9 | 5.0 | 10.1 | 1,700 | 74.0 | 19.1 | 2.0 | 5.1 | 9.55 |

| | Sample No. | Relative density (%) | Strength (kg/mm²) room temperature | Strength (kg/mm²) 1,200° C. | Weight gain due to oxidation (mg/cm²), 1,200° C. × 100 hr |
|---|---|---|---|---|---|
| Sintered body of this invention | 25 | 97.7 | 124 | 67 | 0.21 |
| | 26 | 97.5 | 122 | 66 | 0.12 |
| | 27 | 97.6 | 120 | 67 | 0.20 |
| | 28 | 96.9 | 114 | 61 | 0.45 |
| | 29 | 96.6 | 111 | 62 | 0.44 |

EXAMPLE 3

The same silicon nitride raw powder and powders of sintering aids as used in Example 1 were used to produce sintered bodies. However, in this Example 3, $ZrO_2$ raw material powder was added to a mixture of the silicon nitride and the other sintering aids, or $ZrO_2$ powder formed by the abrasion of the zirconia ceramic grinding balls was added to the mixture, whereby, the influence of the addition form of $ZrO_2$ powder upon the properties of the resulting sintered body was examined. The zirconia ceramic grinding ball is a spherical ball having a diameter of 7 mm, in which the $ZrO_2$ content aids. Moreover, comparison of Sample No. 33 with Sample No. 34, both of which are sintered bodies having the same $ZrO_2$ content, shows that the pulverization time in Sample No. 33 is as short as ¼ of the pulverization time in Sample No. 34, and further Sample No. 33 is exactly same in the properties as Sample No. 34. Therefore, the addition of $ZrO_2$ powder formed by the abrasion of zirconia ceramic grinding balls to a mixture of silicon nitride and the other sintering aids is advantageous by shortening the milling time.

In order to illustrate clearly the effect of the present invention, comparison of a sintered body of Sample No. 31 with that of Sample No. 13 with respect to the strength at room temperature, the strength at 1,200° C. and the weight increase due to oxidation is shown in FIG. 2.

TABLE 3

| | Sample No. | Compounding recipe (wt. %) | | | Weight ratio of $Y_2O_3$/MgO | Firing temperature (°C.) | Composition of sintered body (wt. %) | | | |
|---|---|---|---|---|---|---|---|---|---|---|
| | | $Si_3N_4$ | $Y_2O_3$ (converted value) | MgO (converted value) | $ZrO_2$ (converted value) | | | $Si_3N_4$ | $Y_2O_3$ (converted value) | MgO (converted value) | $ZrO_2$ (converted value) |
| Sintered body of this invention | 30 | 89.1 | 5.3 | 4.3 | 1.3 | 1.22 | 1,750 | 89.3 | 5.4 | 4.2 | 1.3 |
| | 31 | 87.9 | 5.9 | 4.1 | 2.1 | 1.43 | 1,750 | 87.6 | 5.6 | 4.0 | 2.0 |
| | 32 | 86.8 | 6.5 | 2.8 | 3.9 | 2.33 | 1,750 | 86.8 | 6.6 | 2.8 | 3.8 |
| | 33 | 83.4 | 8.9 | 6.0 | 1.7 | 1.48 | 1,750 | 83.5 | 9.0 | 6.1 | 1.6 |
| | 34 | 83.4 | 8.9 | 6.0 | 1.7 | 1.48 | 1,750 | 83.6 | 8.9 | 5.9 | 1.7 |

| | Sample No. | Weight ratio of $Y_2O_3$/MgO | Relative density (%) | Strength (kg/mm$^2$) | | Weight gain due to oxidation (mg/cm$^2$), 1,200° C. × 100 hr | Grinding ball | Pulverization time (hr) | BET specific surface area after pulverization (m$^2$/g) |
|---|---|---|---|---|---|---|---|---|---|
| | | | | room temperature | 1,200° C. | | | | |
| Sintered body of this invention | 30 | 1.29 | 98.1 | 145 | 74 | 0.08 | zirconia ceramics | 2 | 34 |
| | 31 | 1.40 | 98.0 | 146 | 75 | 0.05 | zirconia ceramics | 3 | 32 |
| | 32 | 2.36 | 98.3 | 144 | 78 | 0.07 | zirconia ceramics | 6 | 36 |
| | 33 | 1.48 | 98.6 | 147 | 79 | 0.07 | zirconia ceramics | 2.5 | 33 |
| | 34 | 1.51 | 98.4 | 144 | 73 | 0.08 | nylon | 10 | 29 |

Note
Compounding recipe of sample Nos. 30-33, which contained $ZrO_2$ formed by the abrasion of zirconia ceramic grinding balls during the pulverization step carried out by using the zirconia ceramic grinding balls, was measured by a chemical analysis of the contents of $Y_2O_3$, MgO and $ZrO_2$ in the pulverized raw material mixture.

As described above, according to the method of the present invention, silicon nitride sintered bodies having particularly excellent density, mechanical strength and oxidation resistance can be commercially and inexpensively obtained even by a sintering process under ambient pressure due to the synergistic effect of given amounts of $Si_3N_4$, $Y_2O_3$, MgO and $ZrO_2$. Moreover, the resulting silicon nitride sintered body can be used as engine parts, gas turbine parts, materials for high temperature furnace, bearings for high temperature, and the like, and is very useful for industry.

What is claimed is:

1. Silicon nitride sintered bodies consisting of $Si_3N_4$, O, Y, Mg and Zr, wherein a content of $Si_3N_4$ is 95-70% by weight, a content of yttrium is 15-2% by weight calculated as $Y_2O_3$, a content of magnesium is 15-0.5% by weight calculated as MgO and a content of zirconium is 13-0.5% by weight calculated as $ZrO_2$, said silicon nitride sintered bodies being manufactured by a method consisting essentially of forming a mixed raw material consisting of 95-70% by weight of silicon nitride raw material, yttrium compound of 15-2% by weight calculated as $Y_2O_3$, magnesium compound of 15-0.5% by weight calculated as MgO and zirconium compound of 13-0.5% by weight calculated as $ZrO_2$, into a shaped body, said yttrium compound, magnesium compound and zirconium compound being sintering aids and firing the shaped body at a temperature of 1,650°-1,800° C., under ambient pressure in a nitrogen or an inert gas atmosphere, wherein said sintered bodies have a relative theoretical density of greater than 95%, a four-point flexural strength at 1,200° C. in air of greater than 60 kg/mm$^2$ and a weight increase due to oxidation after exposing in air at 1,200° C. for 100 hours of less than 0.5 mg/cm$^2$.

2. Silicon nitride sintered bodies as claimed in claim 1, wherein a content ratio of Y and Mg is 9-1 calculated as weight ratio of $Y_2O_3$/MgO.

3. The silicon nitride sintered bodies as claimed in claim 1, wherein the zirconium compound is added through abrasion of grinding balls which are used to pulverize the mixed raw powder, and said grinding balls consist of greater than 70% by weight of zirconia and the remainder consists of materials selected from the group consisting of $Y_2O_3$, MgO and mixtures thereof.

4. Silicon nitride sintered bodies consisting of $Si_3N_4$, O, Y, Mg and Zr, wherein a content of $Si_3N_4$ is 95-70% by weight, a content of yttrium is 15-2% by weight calculated as $Y_2O_3$, a content of magnesium is 15-0.5% by weight calculated as MgO and a content of zirconium is 13-0.5% by weight calculated as $ZrO_2$, said silicon nitride sintered bodies being manufactured by a method consisting essentially of mixing together raw materials consisting of 95-70% by weight of silicon nitride raw material, yttrium compound of 15-2% by weight calculated as $Y_2O_3$, magnesium compound of 15-0.5% by weight calculated as MgO and zirconium compound of 13-0.5% by weight calculated as $ZrO_2$, pulverizing the raw materials, drying the pulverized raw materials to result in a shaping powder, forming the shaping powder into a desired shape, said yttrium compound, magnesium compound and zirconium compound being sintering aids, and firing the desired shape at a temperature of 1,650°-1,800° C., under ambient pressure in a nitrogen or an inert gas atmosphere, wherein said sintered bodies have a relative theoretical density of greater than 95%, a four-point flexural strength at 1,200° C. in air of greater than 60 kg/mm$^2$ and a weight increase due to oxidation after exposing in air at 1,200° C. for 100 hours of less than 0.5 mg/cm$^2$.

5. The silicon nitride sintered bodies as claimed in claim 4, wherein said pulverizing may be either wet or dry pulverizing.

6. The silicon nitride sintered bodies of claim 5, wherein said wet pulverizing utilizes a liquid medium selected from the group consisting of acetone, alcohol and water.

7. The silicon nitride sintered bodies of claim 4, wherein the zirconium compound is added through abrasion of grinding balls which consist of greater than 70% by weight of zirconia and the remainder consists of materials selected from the group consisting of $Y_2O_3$, MgO and mixtures thereof.

8. The silicon nitride sintered bodies of claim 4, wherein the yttrium compound and the magnesium compound are added as either a powder or a solution.

9. The silicon nitride sintered bodies of claim 4, wherein an organic binder is added to the pulverized raw materials.

10. The silicon nitride sintered bodies of claim 4, wherein said firing occurs at a temperature of 1,670°–1,750° C.

11. The silicon nitride sintered bodies of claim 4, wherein said firing occurs for 0.5–2 hours.

12. The silicon nitride sintered bodies of claim 10, wherein said firing occurs for 0.5–2 hours.

13. The silicon nitride sintered bodies of claim 4, wherein said silicon nitride raw material is α-phase silicon nitride.

* * * * *